United States Patent
Firdosi

(10) Patent No.: US 8,323,746 B2
(45) Date of Patent: Dec. 4, 2012

(54) COMPOSITION FOR PRODUCING POROUS EVA COATINGS

(75) Inventor: Ansar Firdosi, Elgin, IL (US)

(73) Assignee: Rohm and Haas Company, Philadelphia, PA (US)

( * ) Notice: Subject to any disclaimer, the term of this patent is extended or adjusted under 35 U.S.C. 154(b) by 364 days.

(21) Appl. No.: 12/722,698

(22) Filed: Mar. 12, 2010

(65) Prior Publication Data

US 2010/0247788 A1    Sep. 30, 2010

Related U.S. Application Data

(60) Provisional application No. 61/210,972, filed on Mar. 25, 2009.

(51) Int. Cl.
*B05D 3/02*    (2006.01)

(52) U.S. Cl. ............................. 427/393.5; 106/287.24

(58) Field of Classification Search ............ 427/393.5; 106/287.24

See application file for complete search history.

(56) References Cited

U.S. PATENT DOCUMENTS

| | | | | |
|---|---|---|---|---|
| 3,714,097 A | * | 1/1973 | Cautilli et al. | 524/156 |
| 3,776,810 A | * | 12/1973 | Kelley | 442/327 |
| 3,970,629 A | | 7/1976 | Izaki et al. | |
| 4,684,689 A | * | 8/1987 | Yannich et al. | 524/371 |
| 4,726,997 A | | 2/1988 | Mueller et al. | |
| 5,427,645 A | * | 6/1995 | Lovin | 156/367 |
| 5,492,741 A | | 2/1996 | Akao et al. | |
| 5,662,576 A | * | 9/1997 | Sprehe et al. | 493/195 |
| 6,156,677 A | | 12/2000 | Brown Reed et al. | |
| 6,417,240 B1 | * | 7/2002 | Park | 521/59 |
| 6,764,566 B1 | | 7/2004 | Griesback, III et al. | |
| 2002/0090474 A1 | | 7/2002 | Bean et al. | |
| 2008/0281010 A1 | | 11/2008 | Lefas et al. | |

FOREIGN PATENT DOCUMENTS

| | | |
|---|---|---|
| WO | 2008141721 | 11/2008 |
| WO | 2009006901 | 1/2009 |

* cited by examiner

*Primary Examiner* — Robert S Walters, Jr.
(74) *Attorney, Agent, or Firm* — Kenneth Crimaldi

(57) ABSTRACT

An aqueous composition for producing an ethylene vinyl acetate (EVA) coating. The composition contains ethylene vinyl acetate copolymer, ammonium carbonate, an alkali metal or alkaline earth metal bicarbonate and organic acids.

5 Claims, No Drawings

COMPOSITION FOR PRODUCING POROUS EVA COATINGS

This application claims the benefit of priority under 35 U.S.C. §119(e) of U.S. Provisional Patent Application No. 61/210,972 filed on Mar. 25, 2009.

BACKGROUND

This invention relates generally to an improved composition for producing porous ethylene vinyl acetate (EVA) coatings.

Medical devices often are sterilized by exposing a package of devices to ethylene oxide vapor. The package is enclosed in a polymer-coated paper or nonwoven material which maintains package integrity during its shelf life, keeping out bacteria and other solid contaminants. Substrates used for this purpose include spun bonded polyolefin materials and special grade medical papers. Porosity is a critical property of the polymer coating, whose gas transmission rate must be sufficient to allow effective penetration by the ethylene oxide vapor during the sterilization process. Often, EVA coatings are used for this purpose, and porosity in the coating is created by incorporating particles of solid insoluble resins, which create voids in the dried coating. Variations in particle size of the resins, drying conditions, tackifiers, and other factors can make it difficult to achieve coatings having consistent porosity through the use of solid insoluble resins. For example, U.S. Pat. No. 6,764,566 discloses nonwoven materials with a porous coating made through incorporation of solid insoluble resins. However, this reference does not disclose a method for producing consistent porosity without the use of these materials.

The problem addressed by this invention is to find an alternative composition for producing porous EVA coatings without using solid insoluble resins.

STATEMENT OF INVENTION

The present invention is directed to an aqueous composition for producing an ethylene vinyl acetate (EVA) coating. The composition comprises: (a) an ethylene vinyl acetate copolymer; (b) ammonium carbonate; (c) an alkali metal or alkaline earth metal bicarbonate and (d) an organic acid; wherein said aqueous composition has a pH from 8 to 10.

The present invention is further directed to a method for producing an ethylene vinyl acetate coating by coating a substrate with the aqueous composition to produce a coated substrate and drying the coated substrate.

DETAILED DESCRIPTION

All percentages are weight percentages (wt %), and all temperatures are in ° C., unless otherwise indicated. An "organic acid" is an acidic compound, i.e., one with a $pK_a<6$, measured at 25° C., alternatively less than 5, which contains carbon and hydrogen. All pH values mentioned are measured at 25° C.

Preferably, an organic acid used in the present invention is a carboxylic acid. In one embodiment of the invention, the organic acid is a $C_2$-$C_6$ mono-, di- or tri-carboxylic acid. More than one organic acid may be used in the present method. Organic acids may contain one or more hydroxy groups. Especially preferred organic acids include acetic acid, malic acid, fumaric acid, sorbic acid, citric acid, lactic acid, tartaric acid, malonic acid and oxalic acid. In some embodiments of the invention, an alkali metal or alkaline earth metal bicarbonate used in the present invention is an alkali metal bicarbonate or combination thereof. In some embodiments of the invention, an alkali metal or alkaline earth metal bicarbonate used in the present invention is selected from lithium, sodium, potassium, magnesium, calcium bicarbonate and combinations thereof; alternatively sodium or potassium bicarbonate; alternatively sodium bicarbonate. More than one alkali metal or alkaline earth metal bicarbonate may be present. In some embodiments of the invention, the total amount of organic acid(s) and alkali metal or alkaline earth metal bicarbonate(s) is from 3 to 5 wt % of the total solids in the aqueous composition, alternatively from 3.5 to 5 wt %, alternatively from 3.8 to 4.8 wt %. In some embodiments of the invention, the relative amounts of alkali metal or alkaline earth metal bicarbonate(s) and organic acid(s) are 1 to 3 parts by weight of alkali metal bicarbonate(s) to 0.5 to 1.5 parts by weight of organic acid(s). In some embodiments of the invention, the total amount of organic acid(s) and alkali metal or alkaline earth metal bicarbonate(s) is from 0.8 to 1.35 wt % of the total weight of the aqueous composition, alternatively from 0.9 to 1.35 wt %, alternatively from 1.03 to 1.3 wt %. In some embodiments of the invention, the pH of the aqueous composition is at least 8.2, alternatively at least 8.4, alternatively at least 8.6, alternatively at least 8.8, alternatively at least 8.9; in some embodiments, the pH is no more than 9.8, alternatively no more than 9.6, alternatively no more than 9.4, alternatively no more than 9.3.

In the method of the present invention, the organic acid(s) and alkali metal or alkaline earth metal bicarbonate(s) are added as solids to an aqueous EVA dispersion having a pH from 8 to 10, alternatively from 8.5 to 9.5. The acid(s) and bicarbonate(s) may be added separately, in any order, or they may be added at the same time; they may be blended together before addition. In some embodiments of the invention, an aqueous EVA dispersion having a pH from 8 to 10 is produced by adding ammonium carbonate and ammonia to an initial aqueous dispersion of EVA. Other components added to the initial aqueous EVA dispersion include water, pigment (e.g., titanium dioxide), filler, surfactant, and anti-foam additives. In some embodiments of the invention, the initial aqueous EVA dispersion contains from 25 to 40 wt % polymer solids based on the total weight of the initial aqueous EVA dispersion, alternatively 27 to 35 wt %. In some embodiments of the invention, the EVA polymer contains from 18 to 40 wt % polymerized residues of vinyl acetate monomer and from 60 to 82 wt % polymerized residues of ethylene monomer; alternatively 22 to 32 wt % vinyl acetate residues and 68 to 78 wt % ethylene residues. In some embodiments of the invention, the EVA polymer has a melt index (MI) from 0.5 to 400, alternatively from 0.5 to 8. In some embodiments of the invention, the aqueous EVA dispersion has an average particle size from 1 to 3 µm. Other components may be present in the EVA dispersion, e.g., tackifier resins and anti-blocking additives. In some embodiments of the invention, rosins used as tackifiers comprise from 4 to 15 wt % of the total weight of the initial aqueous EVA dispersion, alternatively 6 to 10 wt %. In some embodiments of the invention, rosins used as tackifiers comprise from 8 to 30 wt % of the total solids weight of the initial aqueous EVA dispersion, alternatively 15 to 25 wt %.

In some embodiments of the invention, the aqueous composition contains from 10 to 30 wt % polymer solids, alternatively 15 to 25 wt %. In some embodiments of the invention, the aqueous composition has from 0.3 to 1.5 wt % ammonium carbonate based on the total weight of the composition, alternatively at least 0.5 wt %, alternatively at least 0.6 wt %; in some embodiments, the composition has no more than 1.3 wt %, alternatively no more than 1.1 wt %. In some embodiments of the invention, the initial aqueous EVA dispersion comprises from 35 to 60 wt % of the aqueous composition, alternatively from 45 to 55 wt %.

In some embodiments of the invention, ammonia is added to the initial aqueous EVA dispersion in the form of aqueous ammonia or gaseous ammonia, preferably aqueous ammonia. In some embodiments of the invention, the pH of the initial aqueous EVA dispersion is adjusted to at least 8.5, alternatively at least 8.7, alternatively at least 8.9, alternatively at least 9. In some embodiments, the pH of the initial aqueous EVA dispersion is adjusted to no more than 9.7, alternatively no more than 9.5. In some embodiments of the invention, addition of ammonia and addition of the alkali metal or alkaline earth metal bicarbonate and organic acid are performed at approximately ambient temperature, i.e., from 10° C. to 35° C., alternatively from 15° C. to 30° C.

The aqueous composition is coated on a substrate by any standard technique known in the art. Preferred techniques include, e.g., air knife, gravure and roll coat. The coating thickness preferably is in the range from 2 to 10 lb./ream (3.3 to 16.7 $g/m^2$), alternatively from 4 to 8 lb./ream (6.7 to 13.4 $g/m^2$). In some embodiments of the invention, the aqueous composition is coated onto the substrate at approximately ambient temperature, i.e., from 10° C. to 35° C., alternatively from 15° C. to 30° C. In some embodiments of the invention, the substrate is a nonwoven fabric or paper (e.g., Kraft paper). In some embodiments of the invention, the substrate has a thickness from 3 to 12 mil (0.076 to 0.305 mm). In some embodiments of the invention, the substrate is a spun bonded polyolefin, one example of which is medical grade TYVEK fabric (spun bonded polyethylene, available from DuPont Corp.).

In some embodiments of the invention, the coated substrate is dried at a drying temperature from 75° C. to 200° C., alternatively from 85° C. to 140° C. In some embodiments, the coated substrate is dried in a drying oven and the drying temperature is the oven temperature. In embodiments of the invention in which the substrate is a spun bonded polyolefin, preferred drying temperature ranges include 90° C. to 140° C., 95° C. to 130° C. and 110° C. to 125° C. In embodiments of the invention in which the substrate is paper, preferred drying temperature ranges include 85° C. to 200° C., 95° C. to 160° C. and 100° C. to 140° C. In some embodiments of the invention, the coated substrate is dried in a forced-air convection oven. In some embodiments of the invention, the drying time is from 10 seconds to 10 minutes, alternatively from 15 seconds to 5 minutes, alternatively from 20 seconds to 3 minutes.

EXAMPLES

Example 1

Preparation of Aqueous EVA Coating Composition

The initial aqueous EVA dispersion is described in the table below.

| Materials | % NVM | PBW | PHR (Solids) | Description |
|---|---|---|---|---|
| EVA co-polymer; MI = 6; VA:E, 28:72 | 100 | 30.472 | 76.181 | |
| polymerized rosin, acid # = 130-155, softening point = 135-145° C. | 100 | 1.633 | 4.083 | tackifier |
| hydrogenated rosin, acid # = 165-175, softening point = 80-95° C. | 100 | 2.463 | 6.158 | tackifier |
| maleic-modified rosin pentaerythritol ester, acid # = 16, softening point = 154-162° C. | 100 | 4.180 | 10.450 | tackifier |
| Oleic acid | 100 | 0.360 | 0.900 | stabilizer |
| 50% KOH | 50 | 1.427 | 1.784 | |
| KOH | 100 | 0.178 | 0.445 | |
| DI Water | 0 | 59.287 | 0.000 | |
| Total | | 100.000 | 100.00 | |

NVM = non-volatile material; PBW = parts by weight; PHR = parts per hundred; acid numbers in mg KOH/g; VA = vinyl acetate; E = ethylene The final aqueous composition is described in the table below. The initial EVA dispersion above was combined with the ingredients listed below except for the ammonia, sodium bicarbonate and citric acid. Ammonia was added to a pH of 9-9.5, followed by the sodium bicarbonate and the citric acid, after which the pH was approximately 9. Samples of compositions having pH values from 8.9 to 9.2 were prepared, and all displayed good storage stability.

| Materials | % NVM | PBW | PHR (Solids) | Generic Chemical name (Description) |
|---|---|---|---|---|
| Initial dispersion described in table above | 40 | 49.639 | 73.539 | EVA co-polymer dispersion |
| D.I. Water | 0 | 17.346 | 0.000 | |
| 28% ammonia | 0 | 2.793 | 0.000 | |
| 10% ammonium carbonate | 0 | 8.606 | 0.000 | |
| R902 $TiO_2$ | 100 | 1.862 | 6.896 | whitening agent |

-continued

| Materials | % NVM | PBW | PHR (Solids) | Generic Chemical name (Description) |
|---|---|---|---|---|
| MISTRON VAPOR coating transfer aid | 100 | 2.684 | 9.941 | magnesium silicate |
| TAMOL 1254 dispersant | 35 | 1.861 | 2.412 | Salt of polycarboxylic acid |
| SURFYNOL-440 | 96 | 0.571 | 2.030 | Ethoxylated 2,4,7,9-tetramethyl 5 decyn-4,7-diol (surfactant) |
| NO FOAM | 100 | 0.141 | 0.522 | aqueous silicone emulsion |
| Sodium bicarbonate | 0 | 0.839 | 3.107 | |
| Citric acid | 0 | 0.419 | 1.552 | |
| D.I. Water | 0 | 13.239 | 0.000 | |
| Total | | 100.000 | 100.00 | |

TAMOL 1254 dispersant is available from Rohm and Haas Co.; SURFYNOL-440 is available from Air Products Co.; NO FOAM is available from Shamrock Chemicals; R902 is available from DuPont; MISTRON VAPOR is available from Cyprus Chemicals.

Example 2

EVA Coatings

The composition of Example 1 and several comparative aqueous compositions were coated on medical grade TYVEK™ (style 1073B). All coatings were applied at about 6.0 lb/ream (10 g/m$^2$) (dry) with # 16 Meyer rod on 8"×12" (20.3×30.5 cm) TYVEK™ sheets and dried in a forced air oven at 120° C. for 1 minute. The porosity of each of the coated TYVEK™ sheet was then measured by using Gurley densitometer. Following are the results in seconds at 100 mL of air displacement through the coated TYVEK™ all porosity values are average of 5 readings. To evaluate the strength of heat seal bonds to the coated substrate, it was heat-sealed to medical trays at 265° C. for 1 sec at 60 psi (513 kPa). Bond strength was tested by pulling the bonds apart at 12 in/min (30.5 cm/min) over the 1 in (2.5 cm) wide seal area. Heat seal bonds are in the range as specified.

| Coating | Coating weight, g/m$^2$ | Bond strength, N/15 mm | Porosity, s/100 mL |
|---|---|---|---|
| Coating A | 9.928 | 6.37-6.95 | >250 |
| Coating B | 9.765 | 5.21-5.8 | 205 |
| Coating C | 9.928 | 5.21-5.8 | 180 |
| Coating D | 10.0 | 6.37-6.95 | 175 |
| Coating E | 9.928 | 6.66-6.95 | >250 |
| Coating F | 9.765 | >6.95 (fiber tear) | 80 |
| Ex. 1 | 10.0 | 5.21-5.8 | 34 |

Coating A is a high molecular weight terpolymer of ethylene, vinyl acetate and methacrylic acid stabilized with ammonia; Coating B is a blend of a high and a low molecular weight EVA copolymers stabilized with KOH; Coating C is high molecular weight EVA and wax stabilized with KOH; Coating D is high molecular weight EVA, wax and thickener stabilized with KOH; Coating E is a low molecular weight terpolymer of ethylene, vinyl acetate and methacrylic acid stabilized with ammonia; Coating F is a blend of a high and a low molecular weight EVA copolymers stabilized with KOH It is apparent that the coating composition of this invention produces an EVA coating having much greater porosity than other EVA coating compositions.

Example 3

Variation in Amount of Alkali Metal Bicarbonate and Organic Acid

Coatings were made as described above in Examples 1 and 2, but with varying amounts of alkali metal bicarbonate and organic acid (based on total solids in the aqueous composition), with the results described in the table below.

| wt % of solid sodium bicarbonate/citric acid | Stability @ RT (3- months) | Coating weight g/m$^2$ | Porosity in seconds/100 cc (average - 5) |
|---|---|---|---|
| 0 | stable | 10 | 132 |
| 2.5 | stable | 10 | 102 |
| 3.5 | stable | 10 | 52 |
| 4.5 | stable | 10 | 34 |
| 5.5 | Unstable (2-days) | NA | NA |

The invention claimed is:

1. An aqueous composition for producing an ethylene vinyl acetate coating; said composition comprising: (a) an ethylene vinyl acetate copolymer comprising from 22 to 32 wt % polymerized residues of vinyl acetate monomer and from 68 to 78 wt % polymerized residues of ethylene monomer; (b) ammonium carbonate; (c) 1 to 3 parts by weight of sodium bicarbonate and (d) 0.5 to 1.5 parts by weight of citric acid; wherein said aqueous composition has a pH from 8 to 10; and wherein a total amount of citric acid and sodium bicarbonate is from 3 to 5 wt % of total weight of solids in the composition.

2. A method for producing an ethylene vinyl acetate coating; said method comprising coating an aqueous composition comprising: (a) an ethylene vinyl acetate copolymer comprising from 22 to 32 wt % polymerized residues of vinyl acetate monomer and from 68 to 78 wt % polymerized residues of ethylene monomer (b) ammonium carbonate; (c) an alkali metal biocarbonate or alkaline earth metal bicarbonate and (d) an organic acid; wherein said aqueous composition has a pH from 8 to 10; on a spun bonded polyolefin in an amount from 2 to 10 lb/ream (3.3 to 16.7 g/m$^2$) to produce a coated spun bonded polyolefin and drying the coated spun bonded polyolefin at an oven temperature from 90° C. to 140° C.

3. The method of claim 2 in which the alkali metal biocarbonate or alkaline earth metal bicarbonate is sodium bicarbonate and the organic acid is citric acid.

4. The method of claim 3 in which the aqueous composition comprises 1 to 3 parts by weight of sodium bicarbonate and 0.5 to 1.5 parts by weight of citric acid.

5. The composition of claim 4 in which a total amount of citric acid and sodium bicarbonate is from 3 to 5 wt % of total weight of solids in the composition.

* * * * *